C. E. RITTER.
HOSE CLAMP.
APPLICATION FILED SEPT. 26, 1918. RENEWED JUNE 23, 1920.
1,373,673.
Patented Apr. 5, 1921.
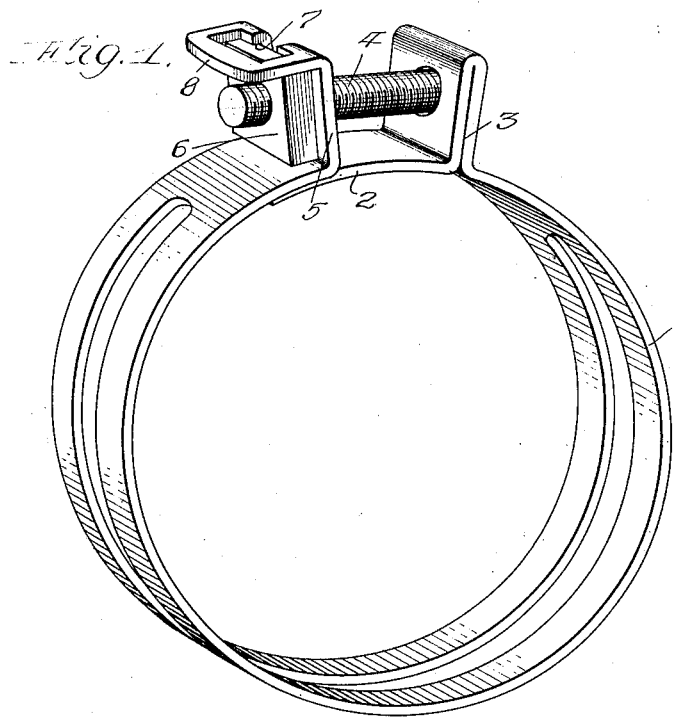
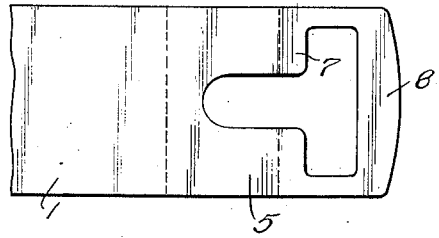
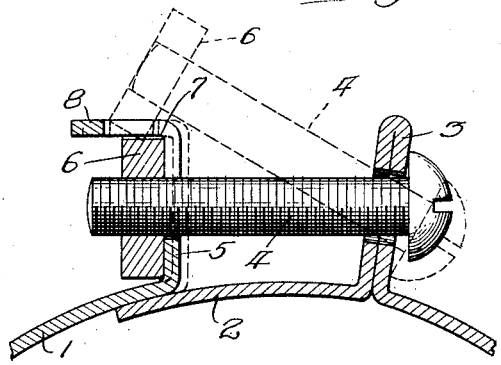
Inventor:
Charles E. Ritter
by Albert Scheible
Attorney
Witness:
R. L. Farrington

UNITED STATES PATENT OFFICE.

CHARLES E. RITTER, OF CHICAGO, ILLINOIS, ASSIGNOR, BY MESNE ASSIGNMENTS, TO J. S. McCHESNEY & CO., OF CHICAGO, ILLINOIS, A CORPORATION OF ILLINOIS.

HOSE-CLAMP.

1,373,673.        Specification of Letters Patent.        Patented Apr. 5, 1921.

Application filed September 26, 1918, Serial No. 255,865. Renewed June 23, 1920. Serial No. 391,159.

*To all whom it may concern:*

Be it known that I, CHARLES E. RITTER, citizen of the United States, residing at Chicago, Illinois, have invented certain new and useful Improvements in Hose-Clamps; and I do hereby declare the following to be a full, clear, and exact description of the invention, such as will enable others skilled in the art to which it appertains to make and use the same.

My invention relates to the general class of metal clamps in which a band is contracted by means of a tightening bolt, of which general class the so called hose clamps are typical. Clamps of this general class have commonly been constructed of a metal band equipped at or near its ends with outwardly projecting ears, which ears are drawn toward each other by a tightening bolt. For this purpose, it has been customary to perforate both of the ears, so that the shank of the bolt would extend through the perforations. If the clamps as thus constructed were shipped in assembled form, it was necessary to remove the nut from the bolt and to entirely remove the bolt from the band to permit the band to be sprung open for application to a hose or the like. Then the shank of the bolt had to be reinserted through the perforations and threaded into the nut before the tightening of the band could begin.

In practice, the necessity of thus detaching main member both from the nut and from the band and of reassembling these parts, requires considerable time, and further time has often been wasted in hunting for the nut in case the same was dropped. Attempts have been made to overcome these objections by extending the perforation in one of the projecting ears so as to make this ear form a fork which would permit one end of the bolt to be moved in or out as desired. However, this in turn has been objectionable because the end of the bolt adjacent to this forked ear was apt to snap out of position if not carefully inserted, or to spring the forks apart and slip through between the forks during the tightening of the bolt.

My invention aims to overcome all of these objections by providing a clamp in which one end is substantially forked so as to permit the bolt to be speedily detached from the same or reattached to the same, but which will afford locking shoulders for preventing an accidental detaching of the bolt when in position, and which will also prevent a spreading of the fork when the bolt is tightened. Illustrative of my invention,—

Figure 1 of the accompanying drawings is a perspective view of a clamp embodying the same.

Fig. 2 is an enlarged fragmentary view of the end of the portion of the metal blank from which the forked end is formed.

Fig. 3 is a fragmentary, enlarged and central section showing the method of locking the nut against accidental detaching, and also showing the method of detaching and reattaching the nut end of the bolt to the forked end of the band.

In the embodiment of the drawings, clamp of my invention consists of a circumferential band 1, desirably slotted for a considerable portion of its length so as to increase its flexibility, and equipped at one end with a tapering tongue 2. Between this terminal tongue and the main portion of the band, the band is doubled upon itself into an ear 3 projecting radially outward of the band and equipped with a perforation, which perforation is somewhat larger in diameter than the shank 4 of the tightening bolt. The other end of the band is bent to form an ear 5 projecting outwardly and substantially radially of the band and terminating in an end portion bent away from the first named ear and substantially parallel to the adjacent main or circumferential portion of the band. The portion of the metal blank from which this doubly bent end part is formed is equipped with a substantially T-shaped slot as shown in Fig. 2, this perforation being so disposed with reference to the bending lines that the head of the T-shaped slot will be disposed entirely in the outer or rearwardly directed part of the ear, while the shank of the T-shaped slot will extend into both parts of the ear. The stem of the T-shaped slot desirably is only slightly greater in width than the shank 4 of the bolt, while the head of the T-shaped slot is slightly larger than the horizontal cross-section of the nut 6 of the bolt when viewed as in Fig. 1.

In shipping the hose clamp as above described, the bolt may be in the position shown in Fig. 3, the two ears being spread apart by the resiliency of the main portion 1 of the band so as to cause the nut to be drawn between the circumferential portion of the band and the two shoulders 7 comprising parts of the rearwardly directed ear disposed at opposite sides of the shank of the T-shaped perforation. These shoulders are desirably spaced from the circumferential portion of the clamp by a distance approximating the height of the nut. When the clamp, assembled in this manner, is to be applied to a hose, the head of the bolt is pressed against the ear 3 and the companion ear is digitally pressed toward the ear 3 for a sufficient distance to allow the nut to clear the shoulders 7, whereupon the nut may be sprung out of the last-named ear by tilting the bolt as shown in dotted lines in Fig. 3. The main member of the clamp may be then sprung open as wide as desired and applied to the object which is to be banded, after which the nut can be slipped back through the head of the T-shaped perforation into its normal position. Then, on tightening the bolt, the shoulders 7 will prevent an accidental slipping of the nut out of its normal position, while the end portion 8 of the doubly bent end of the band will prevent the forked part of the latter from spreading.

It will be obvious from the above that after the clamp has once been assembled during its course of manufacture the nut need not be detached from the bolt at any time, thus saving the time formerly wasted in detaching and reattaching the nut, and also avoiding a possible dropping and even losing of the nut. Indeed, the free end of the shank of the bolt may be slightly enlarged, by staking or otherwise, so as positively to prevent any detaching of the nut. However, while I have illustrated my invention as including a flat metal band with a tapering tongue at one end and as including a bolt with a square end, I do not wish to be limited to these or other details of the construction and arrangement here disclosed, it being obvious that the same might be modified in many ways without departing from the spirit of my invention.

I claim as my invention:

1. A hose clamp comprising a circumferential band of resilient material equipped with two outwardly projecting ears, and a tightening bolt engaging the said ears; one of the said ears being equipped with a perforation sufficiently larger than the shank of the bolt to permit a tilting of the said shank while extending through the perforation; the second ear having its tip extending back substantially parallel to the adjacent circumferential portion of the metal band and being equipped with a substantially T-shaped slot, the cross-bar of the said T being disposed entirely in the said tip of the second ear and the stem of the T extending around the juncture of the tip along the outwardly projecting portion of the second ear; the nut of the bolt being normally in engagement with the portions of the second ear disposed at opposite sides of the stem of the T-shaped slot, the head of the T-shaped slot permitting the passage of the nut therethrough for detaching the nut end of the bolt from the said second ear.

2. A hose clamp comprising a metal circumferential band equipped with two outwardly projecting ears, and a tightening bolt engaging the said ears and including a nut; one of the said ears being equipped with a perforation sufficiently larger than the shank of the bolt to permit a tilting of the said shank while extending through the perforation; the second ear comprising a main portion extending radially outward of the clamp and an end portion extending transversely of the aforesaid portion and in a direction away from the first named ear of the clamp; the second ear having a slot portion extending radially of the clamp inward from the juncture of the said two portions of this ear and adapted to receive the shank of the bolt, and having in its said end portion a slot portion extending transversely of the clamp and adapted to permit the passage of the nut of the bolt therethrough, the said two slot portions being connected and the said second ear having on its end portion shoulder formations disposed laterally of the first named slot and adapted to engage the nut to lock the bolt against movement radially outward of the clamp.

3. A hose clamp comprising a metal circumferential band equipped with two outwardly projecting ears, and a tightening bolt engaging the said ears and including a nut; one of the said ears being equipped with a perforation sufficiently larger than the shank of the bolt to permit a tilting of the said shank while extending through the perforation; the second ear comprising a main portion extending radially outward of the clamp and an end portion extending transversely of the aforesaid portion and in a direction away from the first named ear of the clamp; the second ear having a slot portion extending radially of the clamp inward from the juncture of the said two portions of this ear and adapted to receive the shank of the bolt, and having in its said end portion a slot portion extending transversely of the clamp and adapted to permit the passage of the nut of the bolt therethrough, the said two slot portions being connected and the said second ear having on its end portion shoulder formations disposed laterally of the first named slot and adapted to engage the nut to lock the bolt against movement radially outward of the clamp, the said end portion of the second ear being spaced from the adjacent circumferential portion of the band by a distance closely approximating the width of the nut, thereby causing the nut simultaneously to engage the said shoulders and the juncture of the second ear with the said circumferential portion of the band.

Signed at Chicago, Illinois, September 20th, 1918.

CHARLES E. RITTER.